G. F. J. COLBURN.
BIRD-CAGES.

No. 181,558. Patented Aug. 29, 1876.

Witnesses:
G. B. Towles.
W. V. Hall

Inventor:
George F. J. Colburn

UNITED STATES PATENT OFFICE.

GEORGE F. J. COLBURN, OF WASHINGTON, DISTRICT OF COLUMBIA.

IMPROVEMENT IN BIRD-CAGES.

Specification forming part of Letters Patent No. 181,558, dated August 29, 1876; application filed June 13, 1876.

*To all whom it may concern:*

Be it known that I, GEORGE F. J. COLBURN, of the city of Washington, in the District of Columbia, have invented certain new and useful Improvements in Bird-Cages; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in providing a bird-cage bottom with a saucer or receptacle for sand and gravel, combined with a bathing-cup or fount, so constructed and arranged that each portion can act separate of each other, the trough or saucer preventing the water thrown from the bath-cup by the bird in process of bathing from running into the bottom of the cage; also, by holding the sand and gravel separate from the portion of the cage-bottom usually occupied by the bathing-dish, when used in the ordinary manner, prevents the bottom of the dish from being coated with the refuse that would otherwise adhere to it.

The bathing-cup is so constructed as to answer a double purpose—when upright, to hold water; when reversed, to assist not only to cover and protect the bottom of the cage from the refuse of the cage, but to act as a perch for the bird to rest upon while feeding from the ordinary feed-cups. The separation of the cup from the saucer allows the cup to be removed readily through the door of the cage.

Having thus described the nature of my invention, I will proceed to its construction and operation, reference being had to the accompanying drawings, making part of this specification.

Figure 1:
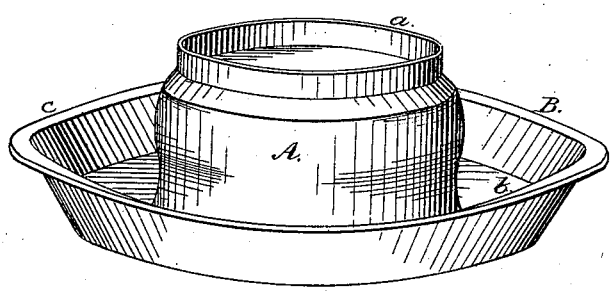
Figure 2:
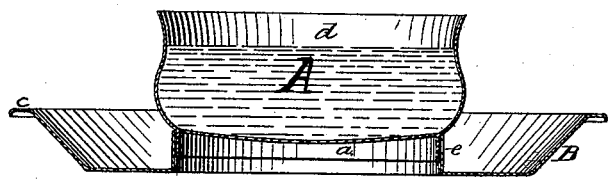
Figure 3:
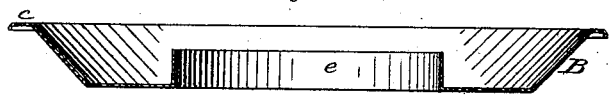
Figure 4:
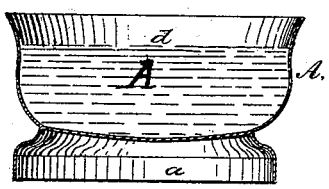

Figure 1, letter A, the cup or fount; B, the saucer or trough combined, when not used for bathing purposes, the cup inverted; *a*, the rim attached to the bottom, serving both as a perch for the bird and to keep the vessel in position when attached to the saucer for bathing purposes; Fig. 2, a section of the same—the cup A, attached to the saucer B, reversed, parallel lines *d d* showing the water; Fig. 3, a sectional drawing of saucer B, showing the inner rim *e*, which serves to hold cup A in position, also preventing the gravel and sand from entering the cage-bottom; Fig. 4, a modified form of bathing-cup.

I make the cup A, Fig. 1, and saucer B, Fig. 3, of metal, or other material suitable for the purpose, stamped, spun, or otherwise formed into a shape to rest securely upon a cage-bottom, and answer, when properly combined, to hold the sand and gravel for the bird and its fount for bathing purposes; also, to protect the cage-bottom from the refuse of the cage. The cup or vessel A, Fig. 1, has a rim or projection formed or attached to its bottom, (shown at *a*.) This is of sufficient height and circumference and thickness to (when the cup is inverted) form a perch for the bird, and to unite it firmly to the saucer, when combined with it, for bathing purposes. This cup can be given a form most suitable for the object intended. One of these is shown at Fig. 4. I make the saucer or trough B, a section of which is shown at Fig. 3, with an outward rim or flange, *c*, bottom *b*, and inner rim or flange *e*. I give this a form and dimensions so that it will readily conform to the shape of the cage-bottom, and rest firmly upon it when in position. The rims *c* and *e* should be of sufficient height to prevent the sand or gravel placed between them from spilling over on the cage-bottom, and the bottom of such a width as to allow of sufficient material to be placed in it for the use of the bird, and to protect the cage-bottom (when combined with the cup or fount) from the water spilled in the act of bathing.

Having described the construction and purposes of my invention, it will be readily seen that it constitutes a valuable addition to a bird-cage, and of considerable convenience to those keeping birds, as its use not only prevents the bottom of the cage from being littered by the refuse of the cage, but (for bathing purposes) a fount is always at hand; also, when the cup or fount is inverted, a circular perch is added for the use of the bird.

The drawings clearly show the invention.

In the construction and use of the bathing-cup and saucer for bird-cages, I would not limit myself strictly to using the two portions A B separately, as they could, should it be deemed essential, be united or made and used in one piece. The separation of the cup from the saucer facilitates the removal of that portion from the door of the cage without removing the whole combination.

I claim as my invention—

The cup A, having rim $a$, in combination with a saucer, B, having rims $c$ $e$, bottom $b$, constructed, arranged, and applied to bird-cages in the manner and for the purpose specified.

In testimony that I claim the foregoing as my own I affix my signature in presence of two witnesses.

GEORGE F. J. COLBURN.

Witnesses:
M. V. HALL,
S. F. AUSTIN.